(12) United States Patent
Kim et al.

(10) Patent No.: US 11,035,302 B2
(45) Date of Patent: Jun. 15, 2021

(54) SYSTEM AND METHOD FOR COPING WITH MALFUNCTION OF ETHANOL SENSOR OF FLEX FUEL VEHICLE

(71) Applicant: Hyundai Kefico Corporation, Gunpo-si (KR)

(72) Inventors: Dongha Kim, Uiwang-si (KR); Youngjin Kim, Seoul (KR)

(73) Assignee: Hyundai Kefico Corporation, Gunpo-si (KR)

( * ) Notice: Subject to any disclaimer, the term of this patent is extended or adjusted under 35 U.S.C. 154(b) by 105 days.

(21) Appl. No.: 16/189,916

(22) Filed: Nov. 13, 2018

(65) Prior Publication Data

US 2019/0153966 A1    May 23, 2019

(30) Foreign Application Priority Data

Nov. 23, 2017    (KR) .................. 10-2017-0157555

(51) Int. Cl.
  *F02D 19/06*    (2006.01)
  *F02D 41/22*    (2006.01)
  (Continued)

(52) U.S. Cl.
  CPC ..... *F02D 19/0623* (2013.01); *F02D 19/0607* (2013.01); *F02D 19/0634* (2013.01);
  (Continued)

(58) Field of Classification Search
  CPC .. F02D 19/087; F02D 19/084; F02D 19/0634; F02D 19/0655; F02D 41/222; F02D 2200/0611; F02D 19/0636
  (Continued)

(56) References Cited

U.S. PATENT DOCUMENTS 4,967,714 A * 11/1990 Inoue .................... F02D 41/148
                                                    123/694
4,986,241 A *  1/1991 Inoue .................. F02D 19/0623
                                                    123/479
(Continued)

FOREIGN PATENT DOCUMENTS

CN    102797568 A    11/2012
CN    103628990 A     3/2014
(Continued)

*Primary Examiner* — Sizo B Vilakazi
*Assistant Examiner* — Brian R Kirby
(74) *Attorney, Agent, or Firm* — Morgan, Lewis & Bockius LLP (57) ABSTRACT

The present invention relates to a system for coping with a malfunction of an ethanol sensor of a FFV. The present invention provides a system for coping with a malfunction of an ethanol sensor of a FFV, the system including: a driving condition detector configured to determine whether a driving condition of the FFV is satisfied; an air-fuel ratio control condition detector configured to determine whether an air-fuel ratio control condition is satisfied; a timer unit configured to calculate a timer value by measuring time when an ethanol content value measured in the ethanol sensor is constant and when the driving condition and the air-fuel ratio control condition are satisfied; and a controller configured to synchronize an ethanol-content learned value with the ethanol content value measured in the ethanol sensor when it is determined that the timer value calculated in the timer unit is higher than a preset critical value.

9 Claims, 8 Drawing Sheets

(51) Int. Cl.
*F02D 19/08* (2006.01)
*F02D 41/00* (2006.01)
*F02D 41/14* (2006.01)
*F02D 41/24* (2006.01)

(52) U.S. Cl.
CPC ....... *F02D 19/0655* (2013.01); *F02D 19/084* (2013.01); *F02D 19/087* (2013.01); *F02D 41/0025* (2013.01); *F02D 41/222* (2013.01); *F02D 41/1454* (2013.01); *F02D 41/2451* (2013.01); *F02D 2200/021* (2013.01); *F02D 2200/023* (2013.01); *F02D 2200/0414* (2013.01); *F02D 2200/0611* (2013.01); *F02D 2200/0612* (2013.01)

(58) Field of Classification Search
USPC ................ 123/406.31; 701/103, 104, 107
See application file for complete search history.

(56) References Cited

U.S. PATENT DOCUMENTS

| | | | | |
|---|---|---|---|---|
| 4,989,570 A | * | 2/1991 | Kuribara | F02D 19/0623 123/494 |
| 5,003,956 A | * | 4/1991 | Iwamoto | F02D 41/222 123/494 |
| 5,007,398 A | * | 4/1991 | Kashiwabara | F02D 19/0623 123/479 |
| 5,109,821 A | * | 5/1992 | Yoshida | F02D 19/088 123/406.15 |
| 5,163,407 A | * | 11/1992 | Yoshida | F02D 19/0678 123/672 |
| 5,170,763 A | * | 12/1992 | Kitajima | F02D 19/0628 123/491 |
| 5,172,655 A | * | 12/1992 | Forgacs | F02D 19/084 123/1 A |
| 5,188,087 A | * | 2/1993 | Saito | F02D 19/087 123/568.21 |
| 5,195,497 A | * | 3/1993 | Yoshida | F02D 41/0025 123/696 |
| 5,400,762 A | * | 3/1995 | Fodale | F02D 19/0623 123/674 |
| 5,520,162 A | * | 5/1996 | Rotramel | F02D 41/0025 123/689 |
| 5,881,703 A | * | 3/1999 | Nankee, II | F02D 41/0025 123/686 |
| 6,023,965 A | * | 2/2000 | Kennie | F02M 25/06 73/114.38 |
| 6,389,874 B1 | * | 5/2002 | Huff | G01N 33/2852 73/1.02 |
| 8,495,996 B2 | * | 7/2013 | Soltis | F02D 41/0025 123/703 |
| 2004/0182378 A1 | * | 9/2004 | Oshimi | F02D 19/088 123/685 |
| 2008/0270005 A1 | * | 10/2008 | Tooyama | F02D 19/087 701/103 |
| 2009/0082947 A1 | * | 3/2009 | Tashima | F02D 41/0025 701/109 |
| 2009/0205622 A1 | * | 8/2009 | Kawakita | F02D 41/0032 123/672 |
| 2009/0248279 A1 | * | 10/2009 | Ito | F02D 19/084 701/109 |
| 2009/0306879 A1 | * | 12/2009 | Takubo | F02D 41/2461 701/104 |
| 2010/0049425 A1 | * | 2/2010 | Tashima | F02D 41/2451 701/109 |
| 2011/0215813 A1 | * | 9/2011 | Sasai | G01R 35/00 324/537 |
| 2012/0048234 A1 | * | 3/2012 | Hamama | F02D 41/0025 123/436 |
| 2012/0083994 A1 | * | 4/2012 | Higuchi | F02D 41/0025 701/103 |
| 2013/0055798 A1 | * | 3/2013 | Matsuura | F02D 19/084 73/114.32 |
| 2013/0151117 A1 | * | 6/2013 | Kim | F02D 28/00 701/103 |
| 2013/0151120 A1 | * | 6/2013 | Kim | F02D 41/1498 701/104 |
| 2013/0268209 A1 | * | 10/2013 | Tashima | G01M 15/04 702/25 |
| 2014/0058596 A1 | * | 2/2014 | Martin | F02D 28/00 701/22 |
| 2015/0160174 A1 | * | 6/2015 | Luken | G01M 15/102 73/23.32 |
| 2016/0097732 A1 | * | 4/2016 | Aoki | F02D 19/0623 324/601 |
| 2016/0245193 A1 | * | 8/2016 | Makled | F02D 35/0015 |
| 2017/0030272 A1 | * | 2/2017 | Hotta | F02D 19/0636 |

FOREIGN PATENT DOCUMENTS

| | | |
|---|---|---|
| CN | 106593662 A | 4/2017 |
| JP | 05-005446 A | 1/1993 |
| JP | 2009-180230 A | 8/2009 |
| JP | 2010-053720 A | 3/2010 |
| JP | 2011-220176 A | 11/2011 |
| JP | 2012-225191 A | 11/2012 |
| KR | 94-0001334 B1 | 2/1994 |
| KR | 1994-0001334 B1 | 2/1994 |
| KR | 10-2010-0028368 A | 3/2010 |
| KR | 10-2013-0064309 A | 6/2013 |
| KR | 10-2013-0065113 A | 6/2013 |

* cited by examiner

SYSTEM AND METHOD FOR COPING WITH MALFUNCTION OF ETHANOL SENSOR OF FLEX FUEL VEHICLE

CROSS-REFERENCE TO RELATED APPLICATION

This application claims priority to and the benefit of Korean Patent Application No. 10-2017-0157555, filed on Nov. 23, 2017, the disclosure of which is incorporated herein by reference in its entirety.

BACKGROUND

Field of the Invention

The present invention relates to a system and method for coping with a malfunction of an ethanol sensor of a flex fuel vehicle (FFV), and more particularly, to a system and method for coping with a malfunction of an ethanol sensor of an FFV in advance by keeping an ethanol-content learned value close to real fuel content through continuous synchronization between the ethanol-content learned value and an ethanol-content value measured in a sensor while the ethanol sensor normally operates.

Discussion of Related Art

With recent acceleration of environmental pollution, various countries have tightened environmental regulations, developed environment-friendly vehicles, and expanded alternative fuel supply. In particular, a policy on spreading bio ethanol as alternative fuel has been enforced in Brazil and North America for the purpose of using less oil and promoting agriculture, and thus there has been rapidly increasing interest in a flex fuel vehicle (FFV) capable of using both the bio ethanol and gasoline.

Specifically, as of 2017, the interest in the FFV has been increasing to the points of allowing gasoline fuel containing up to 15% ethanol to be sold for a vehicle in the United States, and in Brazil, FFV sales accounted for more than 80% of total car sales.

The FFV can burn a mixed gasoline/ethanol fuel in one engine. However, the gasoline has an air-fuel ratio of 14.7, while the ethanol has an air-fuel ratio of 9. Further, the gasoline has an octane number of 92, whereas the ethanol has an octane number of 111. Such major differences in features between the gasoline and the ethanol cause problems such as: i) use of the mixed gasoline/ethanol fuel is not efficient because a spark advance possible in the ethanol is not fully used when ethanol content in the mixed fuel is determined as lower than actual ethanol content, and ii) the engine may be damaged because an excessive spark advance causes knocking, preignition, etc. when ethanol content in the mixed fuel is determined to be higher than actual ethanol content. Therefore, it is very important to determine the exact content of the ethanol in the mixed fuel.

Accordingly, a conventional FFV has used a method of learning the ethanol content with a feedback value of an oxygen sensor on the basis of the difference in the air-fuel ratio between the gasoline and the ethanol (gasoline 14.7 and ethanol 9).

Specifically, the fuel quantity has conventionally been controlled based on the learned ethanol content. When there is a difference between a learned value and real content, signal variations occur in the oxygen sensor. In this case, a current ethanol-content learned value is increased or decreased in accordance with signal values from the oxygen sensor, thereby controlling an air-fuel ratio feedback-control value based on a fuel content deviation to be removed.

Although the method of using the oxygen sensor as described above has an advantage that there is no need for additional parts as compared with that for a gasoline system, problems arise in that it takes about 300 to 800 seconds, which is a long time, to learn the ethanol content, the sensor is vulnerable to noise and degradation, and it is impossible to learn the ethanol content in an idle state or an engine high-load area.

Figure 1:
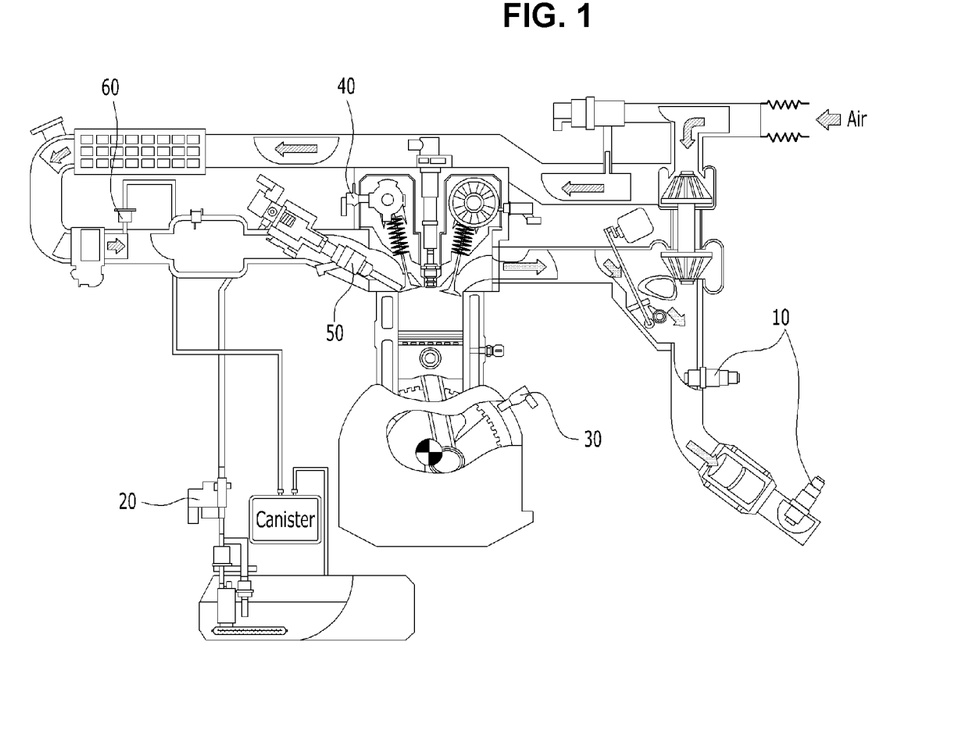
FIG. 1 is a view illustrating a fuel injection system of a flex fuel vehicle (FFV)

To solve the foregoing problems, a method of using an ethanol sensor for directly measuring the ethanol content in the mixed fuel has been introduced so as to immediately and exactly learn the ethanol content even in the case of a turbo gasoline direct injection (GDI) engine, as shown in FIG. 1, which has high combustion pressure and high efficiency.

In the case of the system with the ethanol sensor, control is performed by calculating a fuel quantity factor based on a measured value from the ethanol sensor, and thus the control is more exactly and quickly implemented than that in a sensor system with no ethanol sensor. However, when the ethanol sensor has a malfunction, the measured value of the existing sensor is invalid. In this case, the control based on the sensor has to be switched over to control based on the learned value, but conventional learning using the oxygen sensor is not possible because there are no signal variations of the oxygen sensor for changing the ethanol-content learned value as fuel injection is controlled according to real fuel content while the ethanol sensor normally operates.

Therefore, after the malfunction of the ethanol sensor, it takes time until a control mode using the oxygen sensor for increasing or decreasing the ethanol-content learned value starts. During this time, a deviation between the real fuel content and the learned value may cause engine vibration, excessive exhaust gas, stalling, and similar problems.

In other words, the system with the ethanol sensor may have the problems as described above when the ethanol sensor malfunctions, and therefore a new method is required to learn the ethanol content in advance before the malfunction of the ethanol sensor.

PRIOR ART LITERATURE

Patent Literature (Patent Document 0001) Official Gazette of Korean Laid-open Patent Publication (Publication No. 10-2013-0065113) titled "LEARNING METHOD OF ETANOL CONCENTRAION FOR FFV"

SUMMARY OF THE INVENTION

The present invention is conceived to solve the above problems and directed to providing a system and method for coping with a malfunction of an ethanol sensor that may learn ethanol content in real time even in a flex fuel vehicle (FFV) provided with the ethanol sensor through real-time synchronization between an ethanol-content learned value and an ethanol content value measured by the ethanol sensor while the ethanol sensor normally operates, and thus prevent conventional problems such as an engine vibration, etc., which are likely to arise while switching over to a control mode for using an oxygen sensor to control the ethanol-content learned value while the ethanol sensor malfunctions.

Aspects of the present invention are not limited to the objects mentioned above, and other unmentioned aspects will be clearly understood by a person having an ordinary skill in the art from the following descriptions.

According to one embodiment of the present invention, there is provided a system for coping with a malfunction of an ethanol sensor of an FFV including an oxygen sensor and the ethanol sensor for measuring ethanol content in a mixed fuel, which includes: a driving condition detector configured to determine whether a driving condition of the FFV is satisfied; an air-fuel ratio control condition detector configured to determine whether an air-fuel ratio control condition is satisfied; a timer unit configured to calculate a timer value by measuring time when an ethanol content value measured in the ethanol sensor is constant and when the driving condition detector and the air-fuel ratio control condition detector determine that both the driving condition and the air-fuel ratio control condition are satisfied; and a controller configured to synchronize an ethanol-content learned value with the ethanol content value measured in the ethanol sensor when it is determined that the timer value calculated in the timer unit is equal to or higher than a preset critical value.

Further, the system may additionally include a temperature condition detector configured to determine whether a coolant temperature and an intake-air temperature are equal to or higher than preset temperatures and an error condition detector configured to determine a sensor error in a fuel injection system of the FFV.

In this case, the driving condition detector may determine that the driving condition is satisfied when revolutions per minute (RPM) and a torque value of an engine are constant and within a preset range.

In addition, the air-fuel ratio control condition detector may determine that the air-fuel ratio control condition is satisfied when an air-fuel ratio is within a preset target air-fuel ratio range, when a canister purge valve and an exhaust-gas recirculation (EGR) valve are closed, and when an evaporation loss of ethanol is equal to or lower than a set value.

Further, the controller may control fuel injection quantity based on the ethanol-content learned value synchronized with the ethanol content value measured in the ethanol sensor when it is determined that the ethanol sensor malfunctions.

According to one embodiment of the present invention, there is provided a method of coping with a malfunction of an ethanol sensor of an FFV including an oxygen sensor and the ethanol sensor, the method including: a synchronization requirement determining operation of determining whether a fuel injection system of the FFV satisfies a preset air-fuel ratio control condition, an ethanol sensor condition, and a driving condition of a vehicle; a timer value calculating operation of calculating a timer value by measuring time when it is determined in the synchronization requirement determining operation that the air-fuel ratio control condition, the ethanol sensor condition, and the driving condition are all satisfied; a synchronization determining operation of determining, by comparison between the timer value calculated in the timer value calculating operation and a preset critical value, whether to synchronize an ethanol-content learned value and a measured value of the ethanol sensor; and a synchronization operation of synchronizing the ethanol-content learned value with an ethanol content value measured by the ethanol sensor when it is determined in the synchronization determining operation that the timer value is equal to or higher than the preset critical value.

In particular, the synchronization requirement determining operation may determine that the air-fuel ratio control condition is satisfied when an air-fuel ratio is within a preset target air-fuel ratio range, when a canister purge valve and an EGR valve are closed, and when an evaporation loss of ethanol is equal to or lower than a set value.

Further, the synchronization requirement determining operation may determine that the ethanol sensor condition is satisfied when the measured value of the ethanol sensor is constant In addition, the synchronization requirement determining operation may determine that the driving condition is satisfied when RPM and a torque value of an engine are constant and within a preset range.

Further, the synchronization requirement determining operation may further include: a temperature condition determining operation of determining whether a coolant temperature and an intake-air temperature are equal to or higher than preset temperatures; and an error condition determining operation of determining whether an error occurs in sensors that constitute a fuel injection system of the FFV.

In this case, the method may further include a reset operation of synchronizing the ethanol-content learned value in the synchronization operation, initializing the calculated timer value, and performing the synchronization requirement determining operation again.

Further, the method may further include a fuel injection control operation of controlling fuel injection quantity based on the ethanol-content learned value synchronized in the synchronization operation when it is determined that a malfunction has occurred in the ethanol sensor.

In addition, the method may further include a fuel injection correction operation of correcting the fuel injection quantity by increasing or decreasing the ethanol-content learned value based on the measured value of the oxygen sensor when it is determined that the malfunction occurs in the ethanol sensor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present invention will be described in more detail with reference to the accompanying drawings. Like numerals refer to like elements throughout the figures as much as possible. Further, detailed descriptions about commonly known functions and features which may unnecessarily cloud the gist of the present invention will be omitted.

It will be understood that when a certain element is referred to as being "connected" or "coupled" to another element, it can be directly connected or coupled to another element or intervening elements may be present. Further, when a certain member is referred to as being "above" another member, the certain member may be in contact with another member or an intervening member may be present between the two members.

In this disclosure, the terms "include," "have," etc. used herein specify the presence of stated characteristics, numerals, steps, operations, elements, parts, or combinations thereof, but do not preclude the presence or addition of one or more other characteristics, numerals, steps, operations, elements, parts, or combinations thereof.

Figure 2:
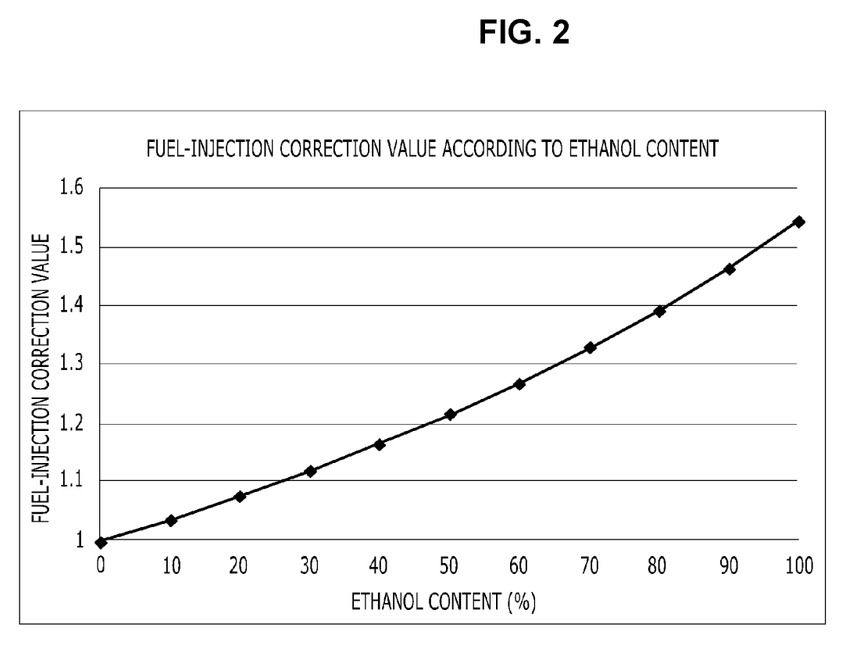
FIG. 2 is a graph showing variation in a fuel-injection correction value as ethanol content changes.
Figure 3:
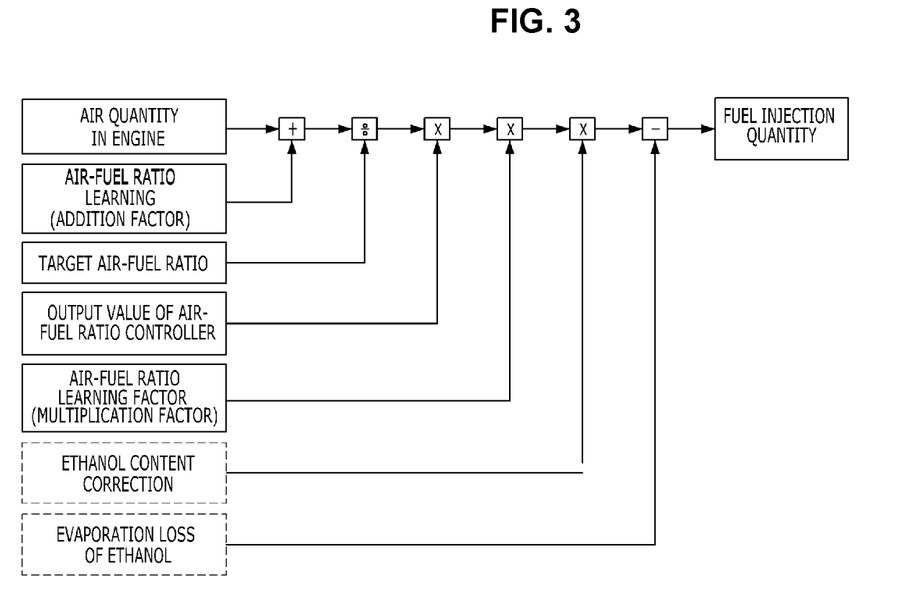
FIG. 3 is a view illustrating a process of controlling fuel injection quantity through a fuel injection system of an FFV.

FIG. 1 is a view illustrating a fuel injection system of a flex fuel vehicle (FFV), FIG. 2 is a graph showing variation in a fuel-injection correction value as ethanol content changes, and FIG. 3 is a view illustrating a process of controlling fuel injection quantity through a fuel injection system of the FFV.

The FFV is a vehicle in which a mixed fuel of gasoline and ethanol is burned in one engine.

As ethanol content increases, such an FFV has to inject more fuel than fuel injection quantity for pure gasoline as shown in FIG. 2. When the FFV calculates the fuel injection quantity, the fuel injection quantity derived in the existing fuel injection quantity control mode as shown in FIG. 3 is multiplied by a correction value according to the ethanol content, and an evaporation loss of ethanol is subtracted from the multiplied results, thereby ultimately obtaining the fuel injection quantity.

In addition to the calculation of the fuel injection quantity, differences in air-fuel ratio and octane number features between the gasoline and the ethanol cause problems: i) the engine is not efficient because a spark advance possible in the ethanol is not fully used when ethanol content in the mixed fuel is determined to be lower than actual ethanol content, and ii) the engine may be damaged because an excessive spark advance causes knocking, preignition, etc. when ethanol content in the mixed fuel is determined to be higher than actual ethanol content. Therefore, the FFV provided with the ethanol sensor 20 for precisely measuring the ethanol content in the mixed fuel has been on the rise.

Since the FFV with the ethanol sensor 20 precisely measures the ethanol content in the mixed fuel, there are no signal variations in an oxygen sensor 10, and thus it is impossible to learn the ethanol content by a conventional ethanol content learning method while the ethanol sensor normally operates. Therefore, it is possible to learn the ethanol content through the oxygen sensor 10 only after the ethanol sensor 20 malfunctions.

However, a deviation between the real fuel content and the learned value may cause engine vibration, excessive exhaust gas, stalling, and similar problems while learning the ethanol content through the oxygen sensor 10 after determining the malfunction of the ethanol sensor 20. To solve these problems, the present invention provides a method of learning ethanol content even when the ethanol sensor 20 normally operates.

First, a system for coping with a malfunction of an ethanol sensor in an FFV according to one embodiment of the present invention will be described with reference to FIGS. 1 and 4.

Figure 4:
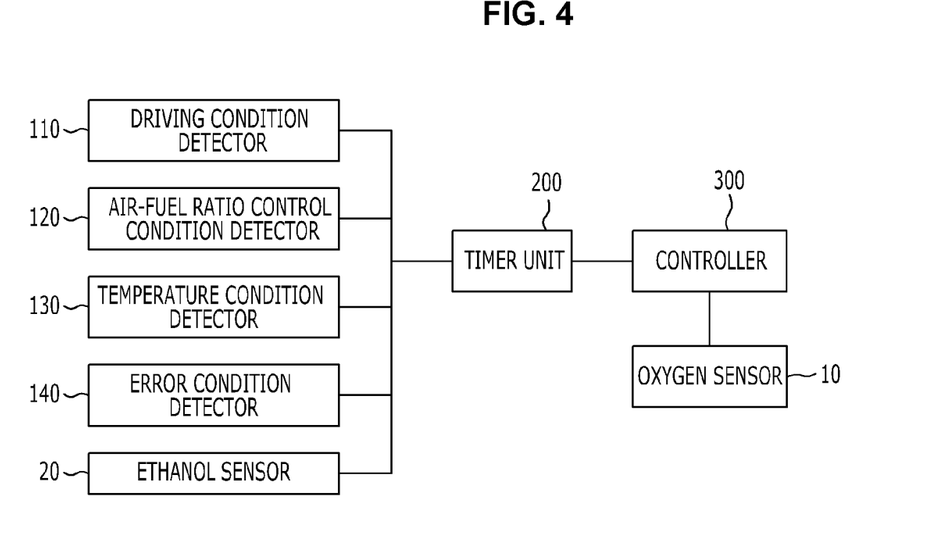
FIG. 4 is a schematic view of a system for coping with a malfunction of an ethanol sensor of an FFV according to one embodiment of the present invention.

FIG. 4 is a schematic view of a system for coping with a malfunction of an ethanol sensor of an FFV according to one embodiment of the present invention.

According to one embodiment of the present invention, a system for coping with a malfunction of the ethanol sensor 20 of the FFV, which includes the oxygen sensor 10 and the ethanol sensor 20 for measuring ethanol content of mixed fuel, includes a driving condition detector 110 for determining whether a driving condition of the FFV is satisfied, an air-fuel ratio control condition detector 120 for determining whether an air-fuel ratio control condition is satisfied, a timer unit 200 for calculating a timer value by measuring time at which an ethanol content value measured by the ethanol sensor 20 is constant and by measuring time at which it is determined by the driving condition detector 110 and the air-fuel ratio control condition detector 120 that the driving condition and the air-fuel ratio control condition are satisfied, and a controller 300 for synchronizing the ethanol-content learned value with the ethanol content value measured in the ethanol sensor 20 when it is determined that the timer value calculated by the timer unit 200 is equal to or higher than a preset threshold value.

Below, elements in the system for coping with the malfunction of the ethanol sensor of the FFV according to the present invention will be described in detail.

First, the oxygen sensor 10 serves to measure concentration of oxygen in exhaust gas and provide information about whether the oxygen concentration is thicker or thinner than that of a theoretical air-fuel ratio of a currently injected fuel quantity so that the fuel injection system can control the fuel injection quantity on the basis of the information.

The ethanol sensor 20 determines the ethanol content in the mixed fuel in real time on the basis of differences in electric properties (in particular, a dielectric constant) between the ethanol and the gasoline, thereby controlling the fuel injection quantity according to the ethanol content.

Next, the driving condition detector 110 for determining whether the driving condition of the FFV is satisfied will be described.

Specifically, the driving condition detector 110 serves to determine whether the driving condition is satisfied as one of conditions used in determining whether to synchronize the measured value of the ethanol sensor with the ethanol-content learned value. The driving condition detector 110 determines that the driving condition is satisfied i) when revolutions per minute (RPM) of the engine are constant and within a preset range and ii) when a torque value of the engine is constant and within a preset range.

Next, the air-fuel ratio control condition detector 120 serves to determine whether the air-fuel ratio control condition is satisfied. The air-fuel ratio control condition detector 120 determines that the air-fuel ratio control condition is satisfied i) when the air-fuel ratio is within a preset target air-fuel ratio range, ii) when a canister purge valve 60 and an exhaust-gas recirculation (EGR) valve (not shown) are closed, iii) when the ethanol evaporation loss is lower than or equal to a set value, iv) when an output value of an air-fuel ratio controller is constant and is within a preset range, and v) when learning of an air-fuel ratio has been completed.

In this case, the ethanol evaporation loss indicates the amount of ethanol that is diluted with engine oil when injected in the engine with a low temperature and which then flows into again the engine through crank ventilation in a gaseous state at a temperature higher than a boiling point.

Further, the system for coping with the malfunction of the ethanol sensor of the FFV according to the present invention may additionally include a temperature condition detector 130 for determining whether a temperature condition is satisfied and an error condition detector 140 for determining a sensor error in the fuel injection system of the In this case, the temperature condition detector 130 checks a coolant temperature and an intake-air temperature and determines that the temperature condition is satisfied i) when the coolant temperature and the intake-air temperature are higher than preset temperatures and ii) when a predetermined period of time elapses after starting the engine.

In addition, the error condition detector 140 determines whether an error condition is satisfied by checking presence of an error in the sensors that constitute the fuel injection system of the FFV, and specifically determines that the error condition is satisfied i) when the oxygen sensor 10 has no errors, ii) when the ethanol sensor 20 has no errors, iii) when a crankshaft position sensor 30 has no errors, iv) when an injector 50 has no errors, v) when an air content measuring system has no errors, and vi) when pinging or knocking does not occur.

The timer unit 200 calculates a timer value by measuring time when the ethanol content value measured in the ethanol sensor 20 is constant and by measuring time when both the driving condition and the air-fuel ratio control condition are satisfied.

In the case of further including the temperature condition detector 130 and the error condition detector 140, the timer value is calculated only when the ethanol content value is constant and both the temperature condition and the error condition as well as both the driving condition and the air-fuel ratio control condition are satisfied.

In this case, the timer unit 200 initializes the timer value when any one of the driving condition, the air-fuel ratio control condition, the temperature condition, the error condition, and the constant condition for the value measured by the ethanol sensor is not satisfied.

Last, the controller 300 serves to synchronize the ethanol-content learned value and the ethanol content value measured by the ethanol sensor 20 and specifically synchronizes the ethanol-content learned value when it is determined that the timer value is greater than or equal to a preset critical value (timer value preset critical value). In this case, the critical value, which is a value variable depending on settings, is previously set in the controller 300.

When it is determined that signal distortion or a similar malfunction occurs in the ethanol sensor 20, the controller 300 controls the fuel injection quantity on the basis of the ethanol content value measured while the ethanol sensor 20 normally operates and the synchronized ethanol-content learned value, thereby minimizing a deviation between the real fuel content and the learned value.

Further, the controller 300 controls the fuel injection quantity on the basis of the ethanol-content learned value synchronized while the ethanol sensor 20 normally operates, and at the same time, switches over to a conventional control mode for increasing or decreasing the ethanol-content learned value on the basis of a signal deviation measured in the oxygen sensor 10, thereby controlling the fuel injection quantity of the FFV.

The mode for increasing or decreasing the ethanol-content learned value through the oxygen sensor 10 is conventionally known, and thus detailed descriptions thereof will be omitted.

Next, a method of coping with a malfunction of an ethanol sensor of an FFV according to another embodiment of the present invention will be described with reference to FIGS. 5 to 7.

Figure 5:
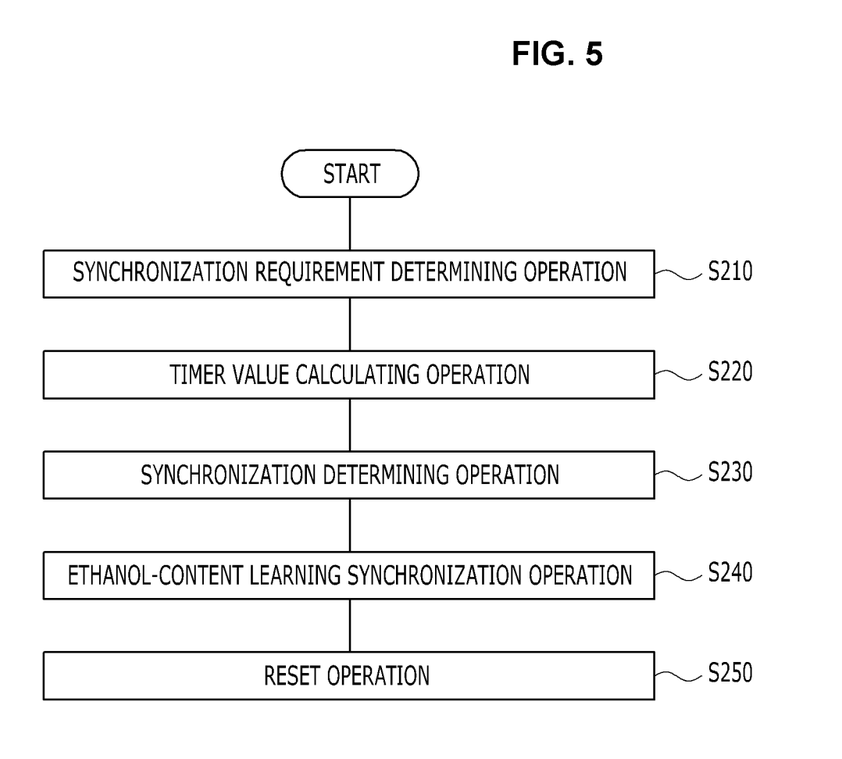
FIG. 5 is a flowchart of a method for coping with a malfunction of an ethanol sensor of an FFV according to another embodiment of the present invention.
Figure 6:
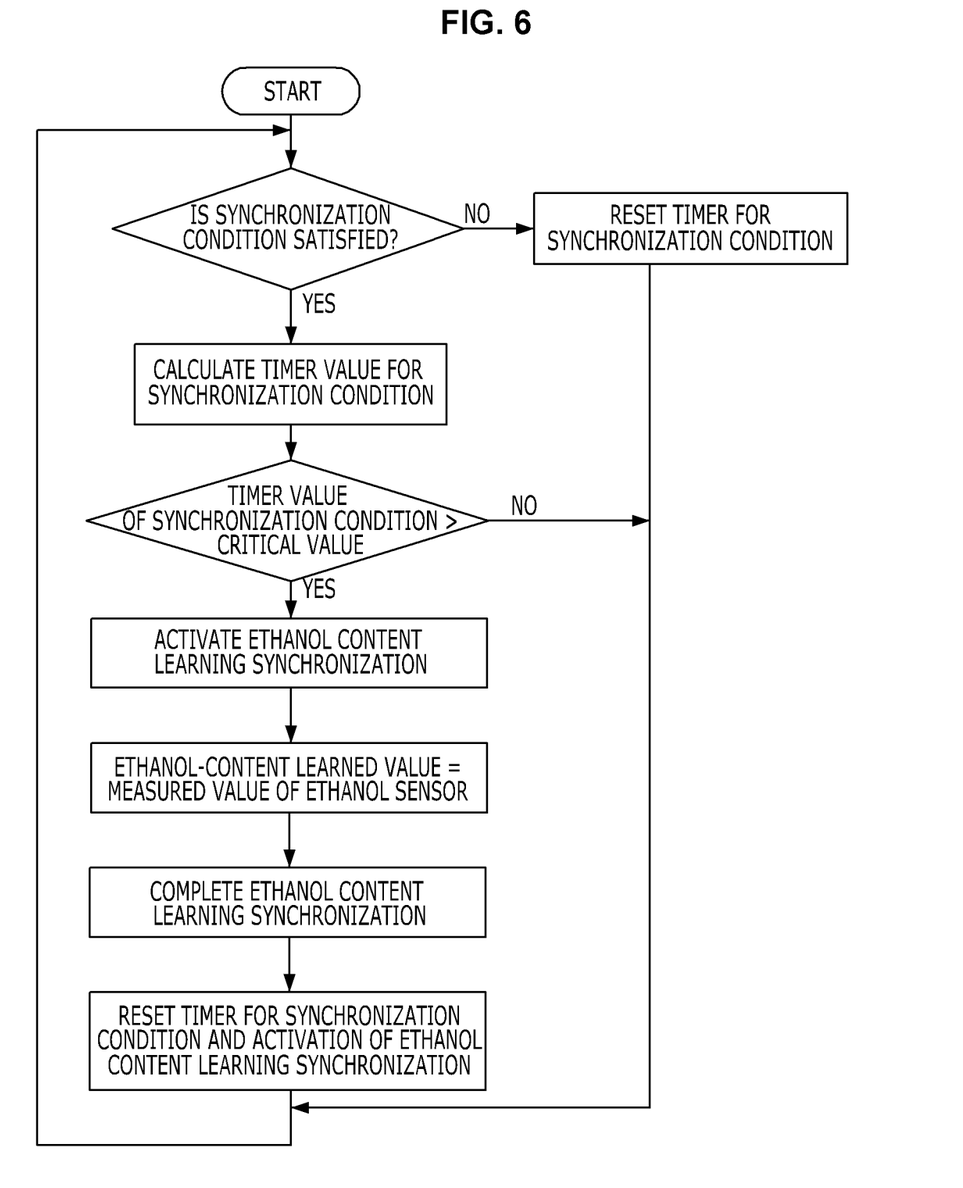
FIG. 6 is a flowchart of a method for coping with a malfunction of an ethanol sensor of an FFV according to the present invention.

FIG. 5 is a flowchart of a method of coping with a malfunction of an ethanol sensor of an FFV according to another embodiment of the present invention, and FIG. 6 is a flowchart of a method of coping with a malfunction of an ethanol sensor of an FFV according to the present invention.

Figure 7A:
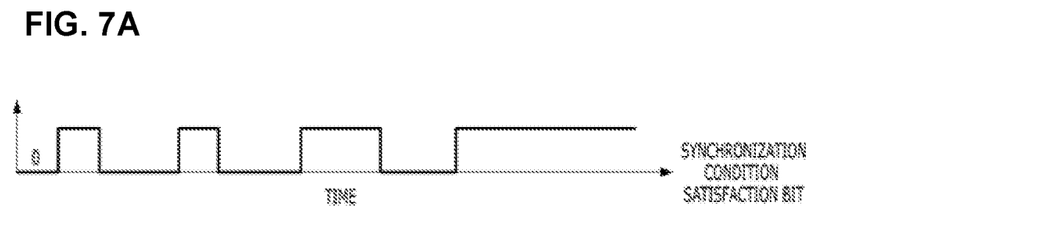
FIG. 7A, FIG. 7B, and FIG. 7C are graphs showing a process of synchronizing an ethanol-content learned value with an ethanol content value measured by an ethanol sensor according to the present invention.
Figure 7B:
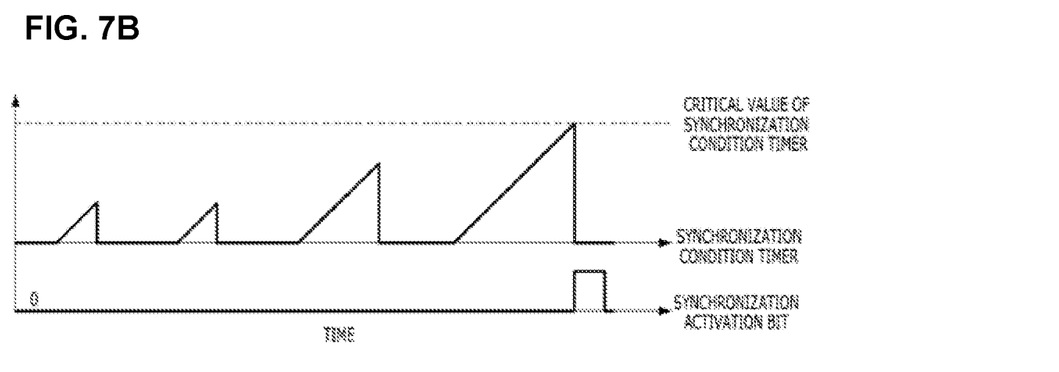
Figure 7C:
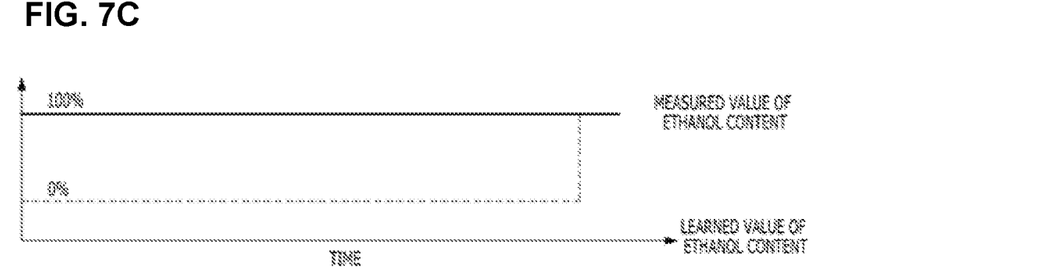

FIG. 7A is a graph showing a signal transmitted to a timer unit when the driving condition, the air-fuel ratio control condition, and the ethanol sensor condition are all satisfied, thereby satisfying the synchronization requirements, and FIGS. 7B and 7C are graphs showing a process for synchronization between a measured value of an ethanol sensor and an ethanol-content learned value only when a timer value is equal to or higher than a critical value.

According to still another embodiment of the present invention, there is provided a method of coping with a malfunction of an ethanol sensor in a fuel injection system of an FFV with an ethanol sensor and an oxygen sensor, which includes a synchronization requirement determining operation of determining whether the fuel injection system of the FFV satisfies a preset air-fuel ratio control condition, an ethanol sensor condition, and a driving condition of a vehicle (S210); a timer value calculating operation of calculating a timer value by measuring time when the air-fuel ratio control condition, the ethanol sensor condition, and the driving condition are all satisfied in the synchronization requirement determining operation S210 (S220); a synchronization determining operation of determining whether to synchronize the ethanol-content learned value with the measured value of the ethanol sensor on the basis of comparison between the timer value calculated in the timer value calculating operation S220 and a preset critical value (S230); and a synchronization operation of synchronizing the ethanol-content learned value with the ethanol content value measured in the ethanol sensor when it is determined in the synchronization determining operation S230 that the timer value is equal to or higher than a previously stored critical value (S240).

In the synchronization requirement determining operation S210, it is determined that the air-fuel ratio control condition is satisfied i) when the air-fuel ratio is within a preset target air-fuel ratio range, ii) when the canister purge valve 60 and the EGR valve (not shown) are closed, iii) when the ethanol evaporation loss is equal to or lower than the set value, iv) when the output value of the air-fuel ratio controller is constant and within a preset range, and v) when learning of the air-fuel ratio has been completed.

Further, in the synchronization requirement determining operation S210, it is determined that the ethanol sensor condition is satisfied i) when the measured value of the ethanol sensor is constant, and it is determined that the driving condition is satisfied i) when the RPM and the torque value of the engine are constant and within a preset range.

In addition, the synchronization requirement determining operation further includes a temperature condition determining operation and an error condition determining operation, thereby improving reliability of the measured value of the ethanol sensor to be synchronized with the ethanol-content learned value.

Specifically, to prevent synchronization at a low temperature area, the temperature condition determining operation determines that the driving condition is satisfied i) when the coolant temperature of the engine is equal to or higher than a preset temperature, ii) when the intake-air temperature of the engine is equal to or higher than a preset temperature, and iii) when a predetermined period of time elapses after starting the engine.

The error condition determining operation determines that the error condition is satisfied i) when the oxygen sensor 10 has no errors, ii) when the ethanol sensor 20 has no errors, iii) when the crankshaft position sensor 30 has no errors, iv) when the injector 50 has no errors, v) when the air content measuring system has no errors, and vi) when pinging or knocking does not occur.

When the timer value calculating operation S220 further includes the foregoing temperature condition determining operation and the error condition determining operation, the timer value is calculated only when the temperature condition and the error condition as well as the air-fuel ratio control condition, the ethanol sensor condition, and the driving condition are all satisfied, but the timer value is initialized when any one of the conditions is not satisfied.

The method of coping with a malfunction of the ethanol sensor of the FFV according to the present invention may further include a reset operation S250, in which the ethanol-content learned value is synchronized in the synchronization operation, the timer value calculated in the timer value calculating operation S220 is initialized, and the synchronization requirement determining operation S210 is performed again, thereby continuously resynchronizing the measured value of the ethanol sensor and the ethanol-content learned value while the ethanol sensor normally operates.

Further, the method of coping with a malfunction of the ethanol sensor of the FFV according to the present invention additionally includes a fuel injection control operation S260 for controlling the fuel injection quantity on the basis of the ethanol-content learned value synchronized in the synchronization operation when it is determined that the malfunction occurs in the ethanol sensor and includes a fuel injection correction operation S270 for correcting the fuel injection quantity by increasing or decreasing the ethanol-content learned value on the basis of the measured value of the oxygen sensor.

Since the method of coping with a malfunction of the ethanol sensor of the FFV according to the present invention includes the fuel injection control operation S260, when it is determined that signal distortion or a similar malfunction occurs in the ethanol sensor, it is possible to control the fuel injection quantity on the basis of the ethanol-content learned value synchronized with the most recently measured ethanol content value (i.e. the value measured while the ethanol sensor normally operates), thereby minimizing a deviation between the real fuel content and the learned value. As a result, it is possible to prevent engine vibration, excessive exhaust gas, stalling, and similar problems that may arise while switching over to the control mode for increasing or decreasing the ethanol-content learned value through the conventional oxygen sensor.

Since the method of coping with a malfunction of the ethanol sensor of the FFV according to the present invention includes the fuel injection correction operation S270, it is possible to minimize the deviation between the real fuel content and the learned value by switching over to the mode for increasing or decreasing the ethanol-content learned value through the oxygen sensor, as in the conventional FFV which does not include the ethanol sensor, after determining the abnormality (or malfunction) of the ethanol sensor.

Last, the effects of the system and method for the malfunction of the ethanol sensor of the FFV according to the present invention will be described with reference to FIG. 8.

Figure 8A:
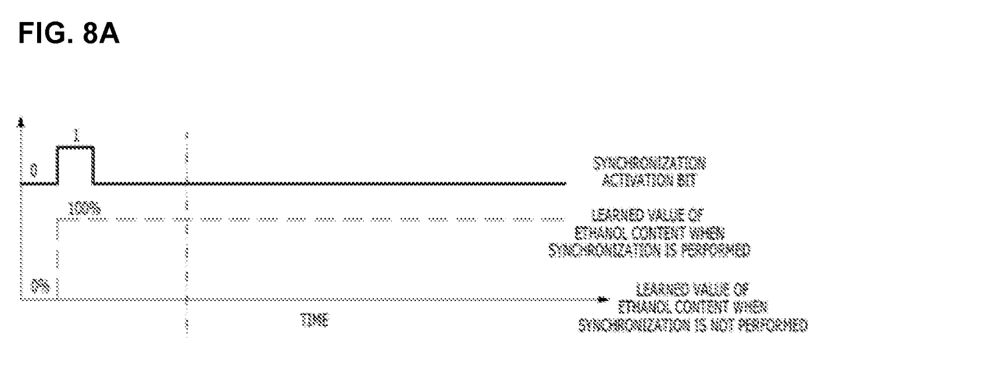
FIG. 8A, FIG. 8B, FIG. 8C, and FIG. 8D are graphs showing differences in effects according to whether synchronization is performed between a sensor measured value and an ethanol-content learned value while an ethanol sensor normally operates.
Figure 8B:
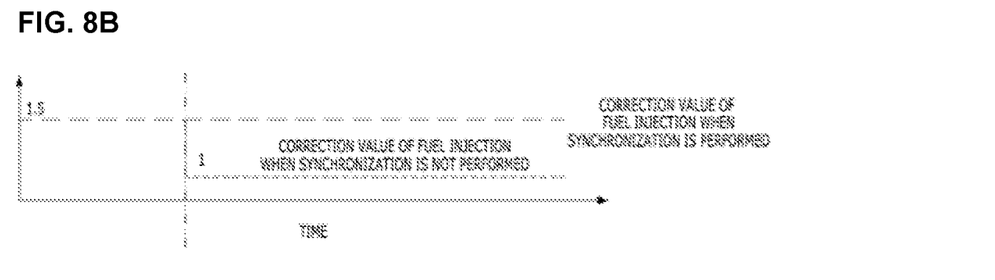
Figure 8C:
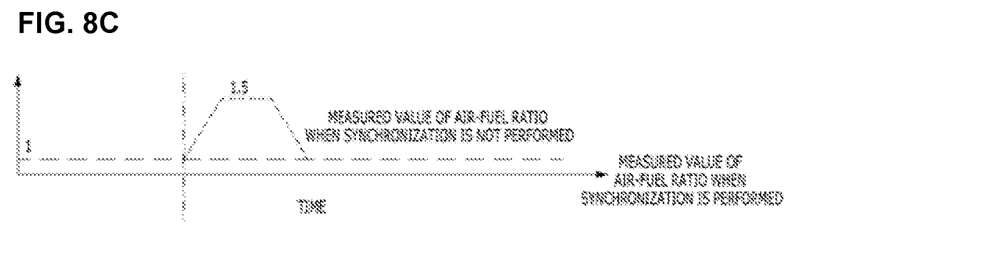
Figure 8D:
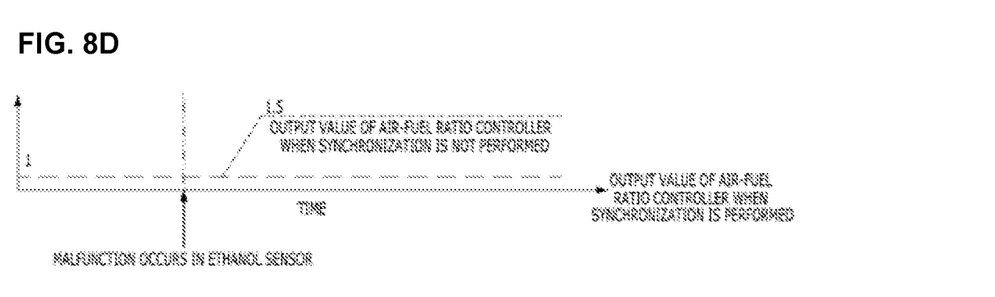

FIG. 8A is a graph showing comparison in the ethanol-content learned value between when the ethanol-content learned value and the ethanol sensor are synchronized and when they are not synchronized, FIG. 8B is a graph showing comparison in the fuel-injection correction value according to whether synchronization with the ethanol-content learned value is performed, FIG. 8C is a graph showing comparison in the air-fuel ratio measured value according to whether synchronization with the ethanol-content learned value is performed, and FIG. 8D is a graph showing output values of the air-fuel ratio controller according to whether synchronization with the ethanol-content learned value is performed.

In addition, FIG. 8 shows one embodiment of the present invention, in which effects are compared according to whether synchronization with the ethanol-content learned value is performed when 100% ethanol content in the mixed fuel actually flows into the engine in a state in which the ethanol-content learned value is 0%.

According to the present invention, it is possible to synchronize the measured value of the ethanol sensor (100% ethanol content) and the ethanol-content learned value even while the ethanol sensor normally operates, and therefore i) the fuel injection quantity is controlled with the fuel-injection correction value corresponding to 100% ethanol content even when the fuel injection is corrected.

On the other hand, ii) when the synchronization is not performed, a deviation is present between the ethanol-content learned value and the ethanol content of the real fuel, and thus the oxygen sensor senses the deviation. A signal deviation is sensed in the oxygen sensor, and then the output value of the air-fuel ratio controller is adjusted on the basis of the signal deviation to thereby reach a theoretical air-fuel ratio state.

In other words, according to the present invention, the value of the ethanol sensor measured while the ethanol sensor normally operates is synchronized with the ethanol-content learned value, and therefore it is possible to minimize time taken in reaching the theoretical air-fuel ratio from a time when the ethanol sensor malfunctions, and thus excessive exhaust gas, engine vibration, stalling, and similar problems due to an air-fuel ratio deviation immediately caused by the malfunction of the ethanol sensor may be prevented.

According to the present invention, when it is determined that the system normally operates, the ethanol content measured in the ethanol sensor is synchronized with the ethanol-content learned value, thereby maintaining the ethanol-content learned value to be similar to the real fuel content.

Accordingly, the fuel quantity is controllable on the basis of the most recently synchronized ethanol-content learned value even when signal distortion or a similar malfunction occurs in the ethanol sensor, thereby preventing engine vibration, excessive exhaust gas, stalling, and similar problems caused by a deviation between the real fuel content and the learned value of the ethanol content.

Although the exemplary embodiments and examples of the present invention have been shown and described, it will be appreciated by a person having an ordinary skill in the art, to which the present invention pertains, that the present invention is not to be construed as being limited to the foregoing specific embodiments and examples, and various changes and modifications can be made in these exemplary embodiments without departing from the principles and spirit of the invention, the scope of which is defined in the appended claims and their equivalents. Further, it will be understood that these changes and modifications are not separate from the technical concept or prospect of the present invention.

The terminology used herein is for the purpose of describing particular embodiments only and is not intended to be limiting to the invention. As used herein, the singular forms are intended to include the plural forms as well, unless the context clearly indicates otherwise.

Thus, it is intended that the present invention covers all such modifications provided they come within the scope of the appended claims and their equivalents.

REFERENCE NUMERALS

10: oxygen sensor
20: ethanol sensor
30: crankshaft position sensor
40: cam position sensor
50: injector
60: canister purge valve
110: driving condition detector
120: air-fuel ratio control condition detector
130: temperature condition detector
140: error condition detector
200: timer unit
300: controller

What is claimed is:

1. A system for coping with a malfunction of an ethanol sensor of a flex fuel vehicle (FFV) comprising an oxygen sensor and the ethanol sensor for measuring ethanol content in a mixed fuel, the system comprising:
a driving condition detector configured to determine whether a driving condition of the FFV is satisfied;
an air-fuel ratio control condition detector configured to determine whether an air-fuel ratio control condition is satisfied;
a timer unit configured to calculate a timer value by measuring time when an ethanol content value measured in the ethanol sensor is constant and when the driving condition detector and the air-fuel ratio control condition detector determine that both the driving condition and the air-fuel ratio control condition are satisfied;
a controller configured to synchronize an ethanol-content learned value with the ethanol content value measured in the ethanol sensor so as to control a fuel injection quantity according to the ethanol-content learned value when it is determined that the timer value calculated in the timer unit is higher than a preset critical value; and
an error condition detector configured to determine a sensor error in sensors in a fuel injection system of the FFV, wherein the sensors constitute the fuel injection system of the FFV and includes the ethanol sensor,
wherein the ethanol-content learned value is pre-updated and held before the preset critical value and before the timer value is higher than the preset critical value, and
wherein when it is determined that the ethanol sensor malfunctions, the controller controls the fuel injection quantity based on the ethanol-content learned value synchronized with the ethanol content value which is measured in the ethanol sensor while the ethanol sensor normally operates, and the controller is configured to correct the fuel injection quantity by increasing or decreasing the ethanol-content learned value based on the measured ethanol content value of the oxygen sensor when it is determined that the malfunction occurs in the ethanol sensor.

2. The system of claim 1, further comprising:
a temperature condition detector configured to determine whether a coolant temperature and an intake-air temperature are equal to or higher than preset temperatures.

3. The system of claim 1, wherein the driving condition detector determines that the driving condition is satisfied when revolutions per minute (RPM) and a torque value of an engine are constant and within a preset range.

4. The system of claim 1, wherein the air-fuel ratio control condition detector determines that the air-fuel ratio control condition is satisfied when an air-fuel ratio is within a preset target air-fuel ratio range, when a canister purge valve and an exhaust-gas recirculation (EGR) valve are closed, and when an evaporation loss of ethanol is equal to or lower than a set value.

5. A method of coping with a malfunction of an ethanol sensor of a flex fuel vehicle (FFV) comprising an oxygen sensor and the ethanol sensor, the management method comprising:
a synchronization requirement determining operation of determining whether a fuel injection system of the FFV satisfies a preset air-fuel ratio control condition, an ethanol sensor condition, and a driving condition of a vehicle;
a timer value calculating operation of calculating a timer value by measuring time when it is determined in the synchronization requirement determining operation that the preset air-fuel ratio control condition, the ethanol sensor condition, and the driving condition are all satisfied;
a synchronization determining operation of determining, by comparison between the timer value calculated in the timer value calculating operation and a preset critical value, whether to synchronize an ethanol-content learned value and an ethanol content value measured in the ethanol sensor;
a synchronization operation of synchronizing the ethanol-content learned value with the ethanol content value measured by the ethanol sensor while the ethanol sensor normally operates so as to control a fuel injection quantity according to the ethanol-content learned value when it is determined in the synchronization determining operation that the timer value is higher than the preset critical value;
a fuel injection control operation of controlling the fuel injection quantity based on the ethanol-content learned value synchronized in the synchronization operation when it is determined that a malfunction occurs in the ethanol sensor;
a fuel injection correction operation of correcting the fuel injection quantity by increasing or decreasing the ethanol-content learned value based on the measured ethanol content value of the oxygen sensor when it is determined that the malfunction occurs in the ethanol sensor; and
an error condition determining operation of determining whether an error condition is satisfied by checking presence of an error in sensors constituting the fuel injection system of the FFV and including the ethanol sensor, wherein the synchronization requirement determining operation determines that the ethanol sensor condition is satisfied when the measured ethanol content value of the ethanol sensor is constant, and wherein the ethanol-content learned value is pre-updated and held before the preset critical value and before the timer value is higher than the preset critical value.

6. The method of claim 5, wherein the synchronization requirement determining operation determines that the air-fuel ratio control condition is satisfied when an air-fuel ratio is within a preset target air-fuel ratio range, when a canister purge valve and an exhaust-gas recirculation (EGR) valve are closed, and when an evaporation loss of ethanol is equal to or lower than a set value.

7. The method of claim 5, wherein the synchronization requirement determining operation includes:

determining that the driving condition is satisfied when revolutions per minute (RPM) and a torque value of an engine are constant and within a preset range.

8. The method of claim 5, wherein the synchronization requirement determining operation further comprises:

a temperature condition determining operation of determining whether a coolant temperature and an intake-air temperature are equal to or higher than preset temperatures.

9. The method of claim 5, further comprising a reset operation of synchronizing the ethanol-content learned value in the synchronization operation, initializing the calculated timer value, and performing the synchronization requirement determining operation again.

\* \* \* \* \*